(12) United States Patent
Fujita (10) Patent No.: US 6,798,510 B2
(45) Date of Patent: Sep. 28, 2004

(54) POLARIZATION DEPENDENT LOSS MEASURING APPARATUS

(75) Inventor: Kiyohisa Fujita, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 40 days.

(21) Appl. No.: 10/322,840

(22) Filed: Dec. 18, 2002

(65) Prior Publication Data

US 2003/0117625 A1 Jun. 26, 2003

(30) Foreign Application Priority Data

Dec. 20, 2001 (JP) .................................. P 2001-388375

(51) Int. Cl.[7] .............................................. G01J 4/00
(52) U.S. Cl. ...................................................... 356/364
(58) Field of Search ................................ 356/364–370, 356/73.1

(56) References Cited

U.S. PATENT DOCUMENTS 5,371,597 A * 12/1994 Favin et al. ................. 356/367
6,204,924 B1 * 3/2001 Cyr ............................. 356/453
6,449,033 B2 * 9/2002 Marro et al. ................ 356/73.1

* cited by examiner

Primary Examiner—Michael P. Stafira
(74) Attorney, Agent, or Firm—Fish & Richardson PC (57) ABSTRACT

Wavelength dependent measurement is made by launching light into an object 8 to be measured and receiving transmitted light from the object 8 while continuously changing wavelengths of output light. Next, peak wavelength detection processing for detecting a wavelength at the time when loss or gain of the transmitted light from the object 8 becomes maximum based on a wavelength dependent measurement result is performed. Then, polarization dependent loss measurement processing for measuring polarization dependent loss of the object 8 is performed by measuring the transmitted light from the object 8 while launching light of a measurement wavelength detected into the object 8 and randomly changing a polarization state of the light. Further, a control circuit processes associating a wavelength dependent analysis result with a PDL measurement result, and displays its result on a display part 2.

6 Claims, 8 Drawing Sheets

POLARIZATION DEPENDENT LOSS MEASURING APPARATUS

BACKGROUND OF THE INVENTION

The present invention relates to a polarization dependent loss measuring apparatus, and particularly to a polarization dependent loss measuring apparatus for measuring loss dependent on a polarized wave of a measured object such as an optical element or an optical transmission line.

A polarization scanning method is known as a measuring method of polarization dependent loss (hereinafter called PDL). The polarization scanning method is a method in which while changing a polarization state of light incident on a measured object every one wavelength by a polarization controller, transmitted light from the measured object is measured by a power meter and a difference (dB scale) between the maximum loss value and the minimum loss value of measured values within certain time is measured as the PDL.

In order to measure the PDL of the measured object exactly, it is necessary to measure all the polarization states. On the other hand, in order to generate states equivalent to all the polarization states by the polarization controller, it is necessary to generate polarization states of the order of 500 randomly. Because of this, measurement time per one wavelength becomes 500 times that of the case of making only wavelength dependent measurement and when PDL measurement is made over all the wavelength ranges, measurement time becomes too long.

Because of this, in PDL measurement by the polarization scanning method generally, it is constructed so that wavelengths (measurement wavelengths) at which the PDL measurement is made are narrowed to some wavelengths to make measurement by checking wavelength dependence of the measured object.

Figure 6:
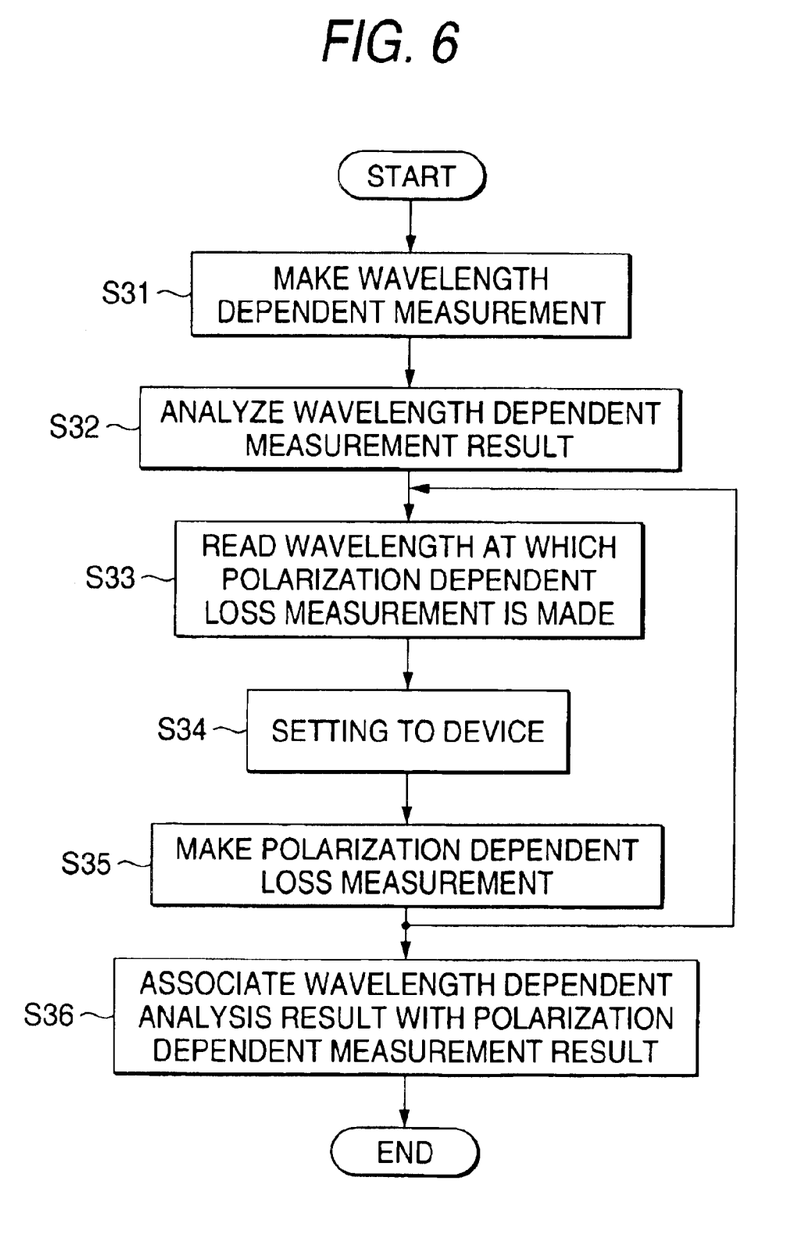
FIG. 6 is a diagram showing a flow of conventional PDL measurement by a polarization scanning method.

FIG. 6 is a diagram showing a flow of conventional PDL measurement by a polarization scanning method.

Figure 7:
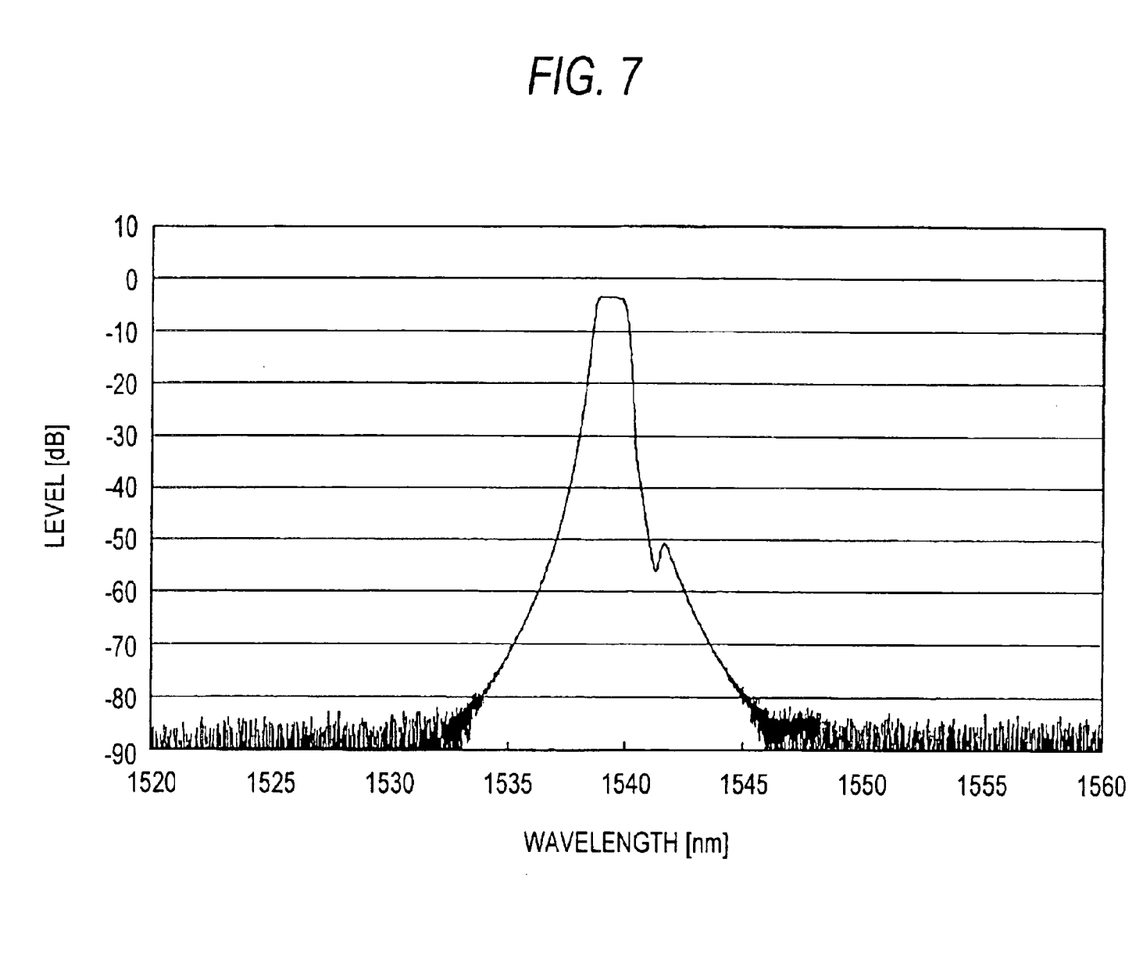
FIG. 7 is a diagram showing one example (example of a peak wavelength) of a wavelength dependent measurement result.

In the case of PDL measurement, wavelength dependent measurement of a measured object is first made (S31). The wavelength dependent measurement is made by measuring transmitted light from the measured object by a power meter while changing a wavelength of light incident on the measured object. When a wavelength is taken as the axis of abscissa and a level (dB) is taken as the axis of ordinate and measured values are plotted, wavelength dependence as shown in FIG. 7 is observed.

Next, a wavelength dependent measurement result is analyzed (S32), and a wavelength at which the PDL measurement is made, namely a wavelength at which loss (or gain) of the transmitted light becomes maximum is read (S33).

Then, measurement wavelengths are set to a measuring device (S34), and PDL measurement is made (S35). The PDL measurement is made by randomly changing a polarization state by a polarization controller every the measurement wavelength.

After the completion of the measurement described above, a wavelength dependent analysis result is associated with a PDL measurement result (S36). That is, processing for arranging the PDL measurement result as a measurement result every the measurement wavelength is performed.

However, in the conventional PDL measurement by the conventional polarization scanning method shown in FIG. 6, an operator performed analysis (S32) of the wavelength dependent measurement result (FIG. 7), reading of the wavelength at which the PDL measurement is made (S33), setting to the measuring device (S34) and association of the wavelength dependent analysis result with the PDL measurement result, so that there were problems that it takes time and effort to make the PDL measurement and also it takes effort to be constructed so that the PDL measurement result can be grasped as a measurement result every the measurement wavelength.

That is, the operator had to hold a value of the read wavelength once in some manner, for example, by making a note even in the case of using an analysis function which the measuring device has with respect to the wavelength dependent analysis.

Also, it is necessary to input the held value to the device one by one to make measurement, so that it took effort to make the measurement. Rather than one or two values to be inputted, inputting several tens of kinds of values one by one to make the measurement is work with enormous effort.

Also, the PDL measurement result obtained finally is not associated with the wavelength dependent measurement result and is acquired individually, so that the operator has to perform the association after the completion of all the measurements.

SUMMARY OF THE INVENTION

The invention is implemented in view of such problems of the conventional technique, and an object of the invention is to provide a polarization dependent loss measuring apparatus capable of automatically making PDL measurement and association of a PDL measurement result with a wavelength dependent measurement result.

In order to solve the object, a polarization dependent loss measuring apparatus according to the invention is characterized by comprising wavelength dependent measurement member for measuring transmitted light from a measured object while changing a wavelength of light incident on the measured object, peak wavelength detection member for detecting a wavelength at the time when a level of loss or gain of the transmitted light becomes maximum based on a measurement result by the wavelength dependent measurement member, polarization dependent loss measurement member for measuring polarization dependent loss of the measured object by measuring the transmitted light from the measured object while launching light of a wavelength detected by the peak wavelength detection member into the measured object and also randomly changing a polarization state of the light, measurement result processing member for performing association processing of a measurement result by the polarization dependent loss measurement member with a detection result by the peak wavelength detection member, and output member for outputting a processing result by the measurement result processing member as described in aspect 1.

As a result of this, PDL measurement and association of a PDL measurement result with a wavelength dependent measurement result can be made automatically, so that the PDL measurement can be made easily in a short time and the PDL measurement result can be grasped easily as a measurement result every each the measurement wavelength.

Further, a polarization dependent loss measuring apparatus according to the invention is characterized in that the peak wavelength detection member executes a step of detecting the maximum value of the level from all the wavelength ranges based on the measurement result by the wavelength dependent measurement member, a step of performing a cutback in a measurement level value using the maximum value and a preset threshold value, a step of detecting inflection points of the level in the longer wavelength side and the shorter wavelength side than a wavelength showing the maximum value, and a step of detecting a wavelength corresponding to the maximum value as a wavelength at the time when the level becomes maximum when the inflection points of the level are present in both of the longer wavelength side and the shorter wavelength side than the wavelength showing the maximum value as described in aspect 2.

As a result of this, peak wavelength detection can be performed more surely in the peak wavelength detection member for detecting a wavelength at the time when a level of loss or gain of the transmitted light becomes maximum based on a measurement result by the wavelength dependent measurement member.

Also, a polarization dependent loss measuring apparatus according to the invention is characterized by comprising wavelength dependent measurement member for measuring transmitted light from a measured object while changing a wavelength of light incident on the measured object, notch wavelength detection member for detecting a wavelength at the time when a level of loss or gain of the transmitted light becomes minimum based on a measurement result by the wavelength dependent measurement member, polarization dependent loss measurement member for measuring polarization dependent loss of the measured object by measuring the transmitted light from the measured object while launching light of a wavelength detected by the notch wavelength detection member into the measured object and also randomly changing a polarization state of the light, measurement result processing member for performing association processing of a measurement result by the polarization dependent loss measurement member with a detection result by the notch wavelength detection member, and output member for outputting a processing result by the measurement result processing member as described in aspect 3.

As a result of this, PDL measurement and association of a PDL measurement result with a wavelength dependent measurement result can be made automatically, so that the PDL measurement can be made easily in a short time and the PDL measurement result can be grasped easily as a measurement result every each the measurement wavelength.

Also, a polarization dependent loss measuring apparatus according to the invention is characterized in that the notch wavelength detection member executes a step of detecting the minimum value of the level from all the wavelength ranges based on the measurement result by the wavelength dependent measurement member, a step of performing a cutback in a measurement level value using the minimum value and a preset threshold value, a step of detecting inflection points of the level in the longer wavelength side and the shorter wavelength side than a wavelength showing the minimum value, and a step of detecting a wavelength corresponding to the minimum value as a wavelength at the time when the level becomes minimum when the inflection points of the level are present in both of the longer wavelength side and the shorter wavelength side than the wavelength showing the minimum value as described in aspect 4.

As a result of this, notch wavelength detection can be performed more surely in the notch wavelength detection member for detecting a wavelength at the time when a level of loss or gain of the transmitted light becomes minimum based on a measurement result by the wavelength dependent measurement member.

Further, a polarization dependent loss measuring apparatus according to the invention is characterized in that the output member produces an output by displaying or printing a processing result by the measurement result processing member as described in aspect 5.

As a result of this, an operator can check the processing result outputted by displaying or printing.

DETAILED DESCRIPTION OF THE PREFERRED EMBODIMENTS

An embodiment according to the invention will be described below with reference to the drawings.

Figure 1:
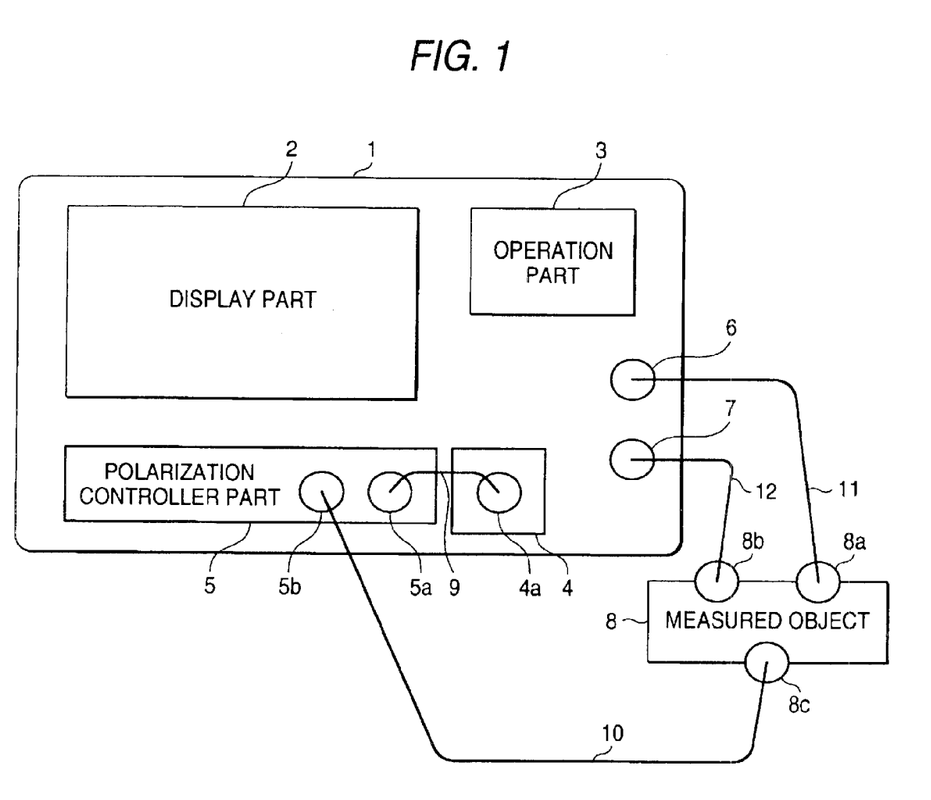
FIG. 1 is a block diagram showing one example of an embodiment of a polarization dependent loss measuring apparatus according to the invention.

FIG. 1 is a block diagram showing a configuration example of a polarization dependent loss measuring apparatus according to the invention.

A polarization dependent loss measuring apparatus 1 of the present embodiment comprises a display part 2, an operation part 3, a wavelength variable optical output part 4, a polarization controller part 5, a first light receiving part 6, a second light receiving part 7, and a control circuit (not shown)

Each the part of the polarization dependent loss measuring apparatus 1 is centralized and controlled by the control circuit. The display part 2 is output member for displaying a wavelength dependent measurement result or a polarization dependent loss measurement result.

The operation part 3 is provided with various operators (not shown) such as a measurement start button, a measurement mode switching button or a display switching button.

The wavelength variable optical output part 4 has an optical output terminal 4a, and continuously changes a wavelength of light outputted from the optical output terminal 4a or outputs light of a constant wavelength set.

The polarization controller part 5 has an optical input terminal 5a and an optical output terminal 5b, and randomly changes a polarization state of light inputted from the optical input terminal 5a to output it from the output terminal 5b.

The first light receiving part 6 and the second light receiving part 7 receive light from a first port 8a and a second port 8b of a measured object 8, respectively, and form an optical power meter for measuring its light amount.

The optical output terminal 4a of the wavelength variable optical output part 4 and the optical input terminal 5a of the polarization controller part 5 are mutually connected through an optical fiber 9. The optical output terminal 5b of the polarization controller part 5 and an input port (common port) 8c of the measured object 8 are mutually connected through an optical fiber 10. The first port 8a of the measured object 8 and the first light receiving part 6 are mutually connected through an optical fiber 11. The second port 8b of the measured object 8 and the second light receiving part 7 are mutually connected through an optical fiber 12. A polarization maintaining optical fiber is used in at least the optical fiber 10 among these optical fibers 9 to 12.

By the configuration described above, output light from the wavelength variable optical output part 4 is inputted to the polarization controller part 5 through the optical fiber 9. Output light from the polarization controller part 5 is inputted to the measured object 8 through the optical fiber 10. Transmitted light from the measured object 8 is inputted to the first light receiving part 6 through the optical fiber 11 and is inputted to the second light receiving part 7 through the optical fiber 12, respectively.

Figure 2:
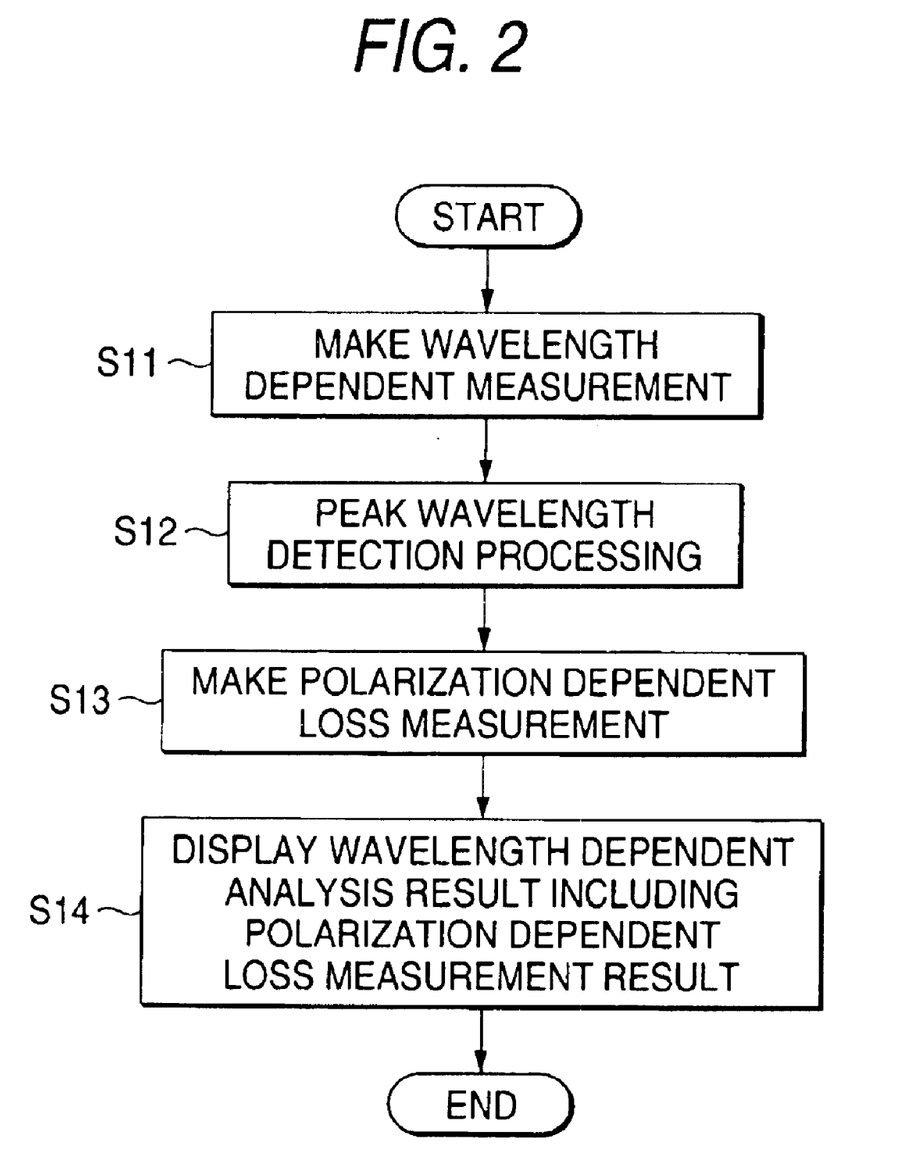
FIG. 2 is a diagram showing a flow of PDL measurement by the polarization dependent loss measuring apparatus shown in FIG. 1.

FIG. 2 is a diagram showing a flow of PDL measurement by the polarization dependent loss measuring apparatus 1 of this embodiment.

In the case of PDL measurement, first, wavelength dependent measurement of a measured object is made (S11). At this time, a function of the polarization controller part 5 is stopped. Then, the wavelength dependent measurement is made by launching light into the measured object 8 and receiving transmitted light from the measured object 8 by the first light receiving part 6 and the second light receiving part 7 while continuously changing wavelengths of output light by the wavelength variable optical output part 4.

Next, peak wavelength detection processing for detecting a wavelength (measurement wavelength) at the time when loss or gain of the transmitted light from the measured object 8 becomes maximum based on a wavelength dependent measurement result is performed (S12). At that time, the control circuit detects a peak wavelength (measurement wavelength) by storing the wavelength dependent measurement result, namely measurement data showing a relation between a wavelength and a level value in memory (not shown) and analyzing this measurement data.

Then, polarization dependent loss measurement processing for measuring polarization dependent loss of the measured object 8 is performed by measuring the transmitted light from the measured object 8 while launching light of the measurement wavelength detected by the peak wavelength detection processing (S12) into the measured object 8 and also randomly changing a polarization state of the light (S13). At that time, the control circuit controls the wavelength variable optical output part 4 so as to sequentially output the light of the measurement wavelength, and also controls the polarization controller part 5 so as to randomly change the polarization state every measurement wavelength.

After the completion of the measurement described above, the control circuit performs processing for associating a wavelength dependent analysis result with a PDL measurement result, and displays its result on the display part 2 (S14).

A series of these processing (S11 to S14) is automatically performed by merely pushing a measurement start button of the operation part 3 after connecting the optical fibers 9 to 12 to the polarization dependent loss measuring apparatus 1 and setting the measured object 8 as shown in FIG. 1.

Figure 4:
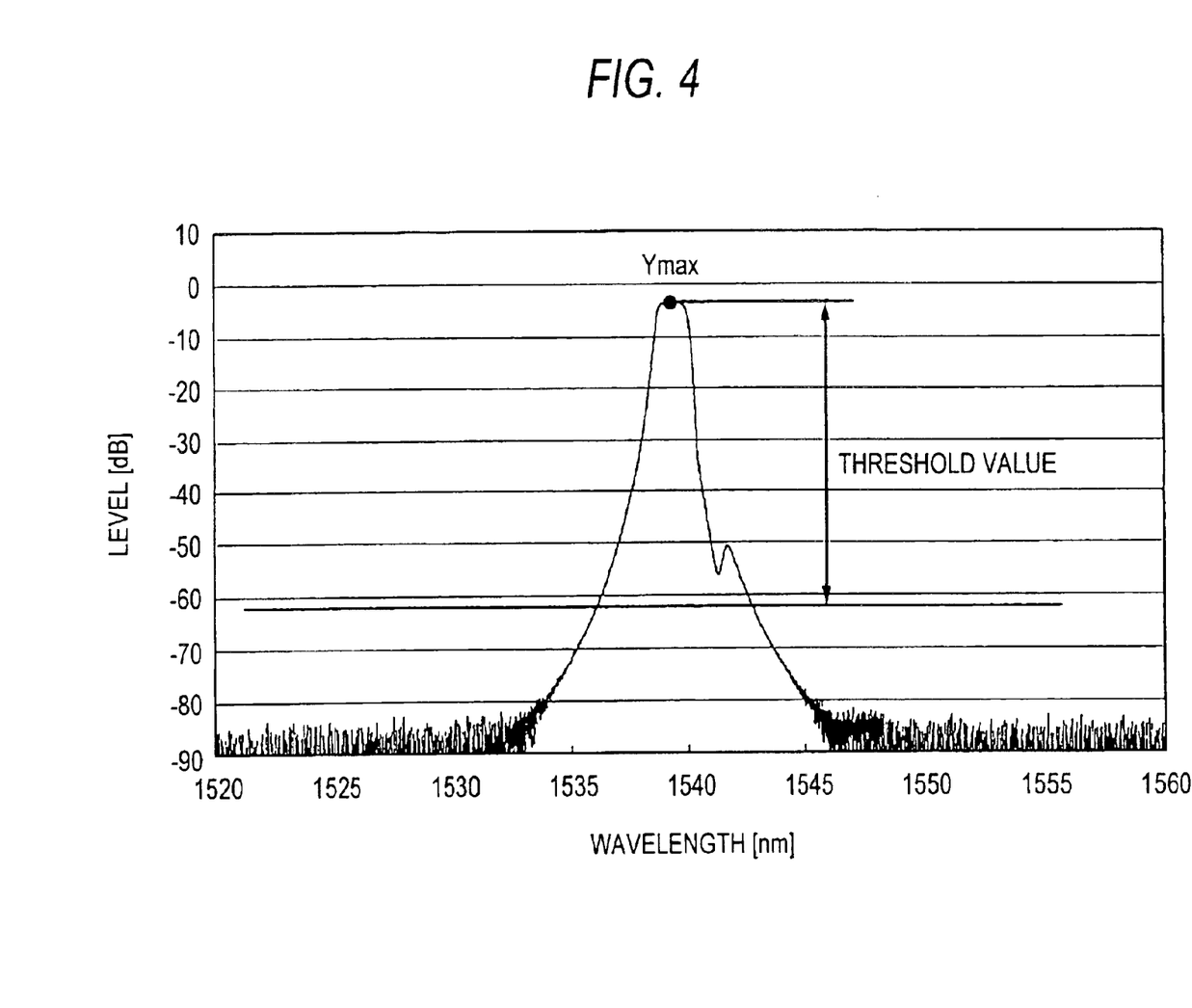
FIG. 4 is an explanatory diagram of a level maximum value detection method in the peak wavelength detection processing.
Figure 5:
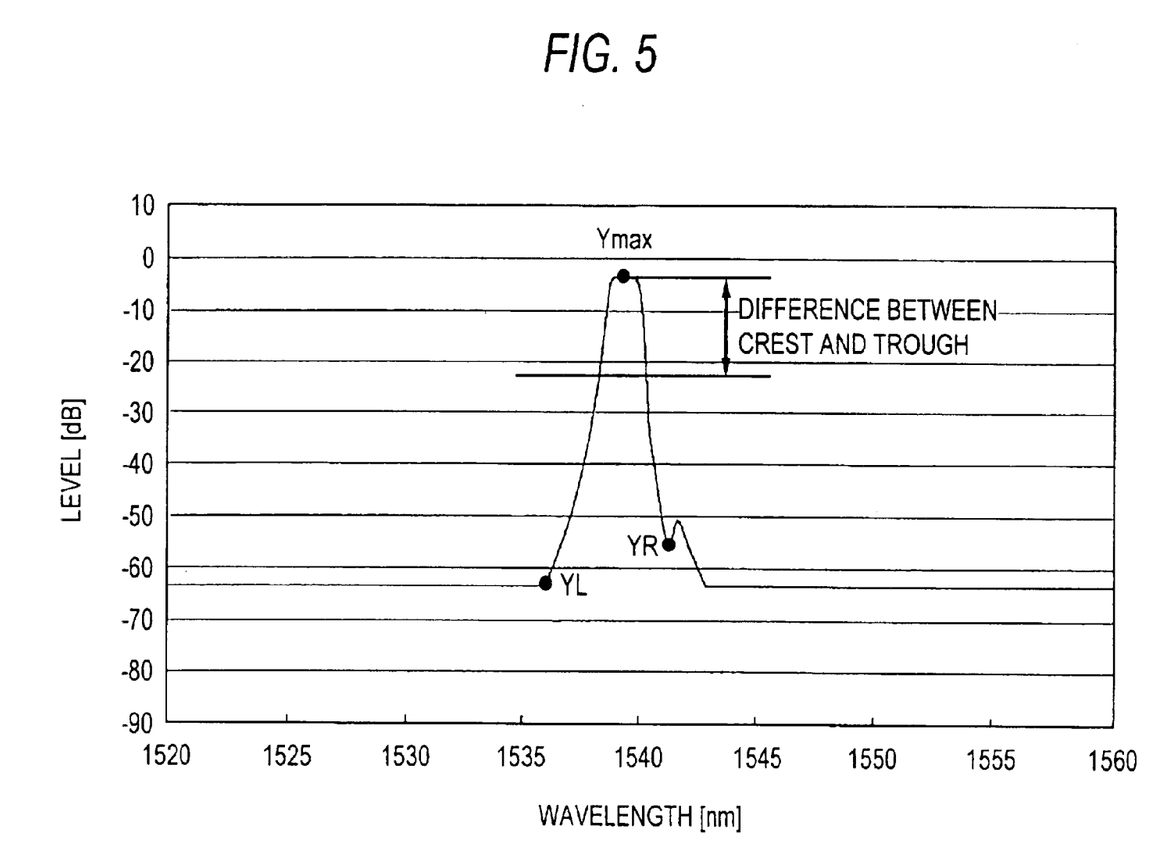
FIG. 5 is an explanatory diagram of the level maximum value detection method in the peak wavelength detection processing.

Next, the contents of the peak wavelength detection processing (S12) will be described using FIGS. 3 to 5.

Figure 3:
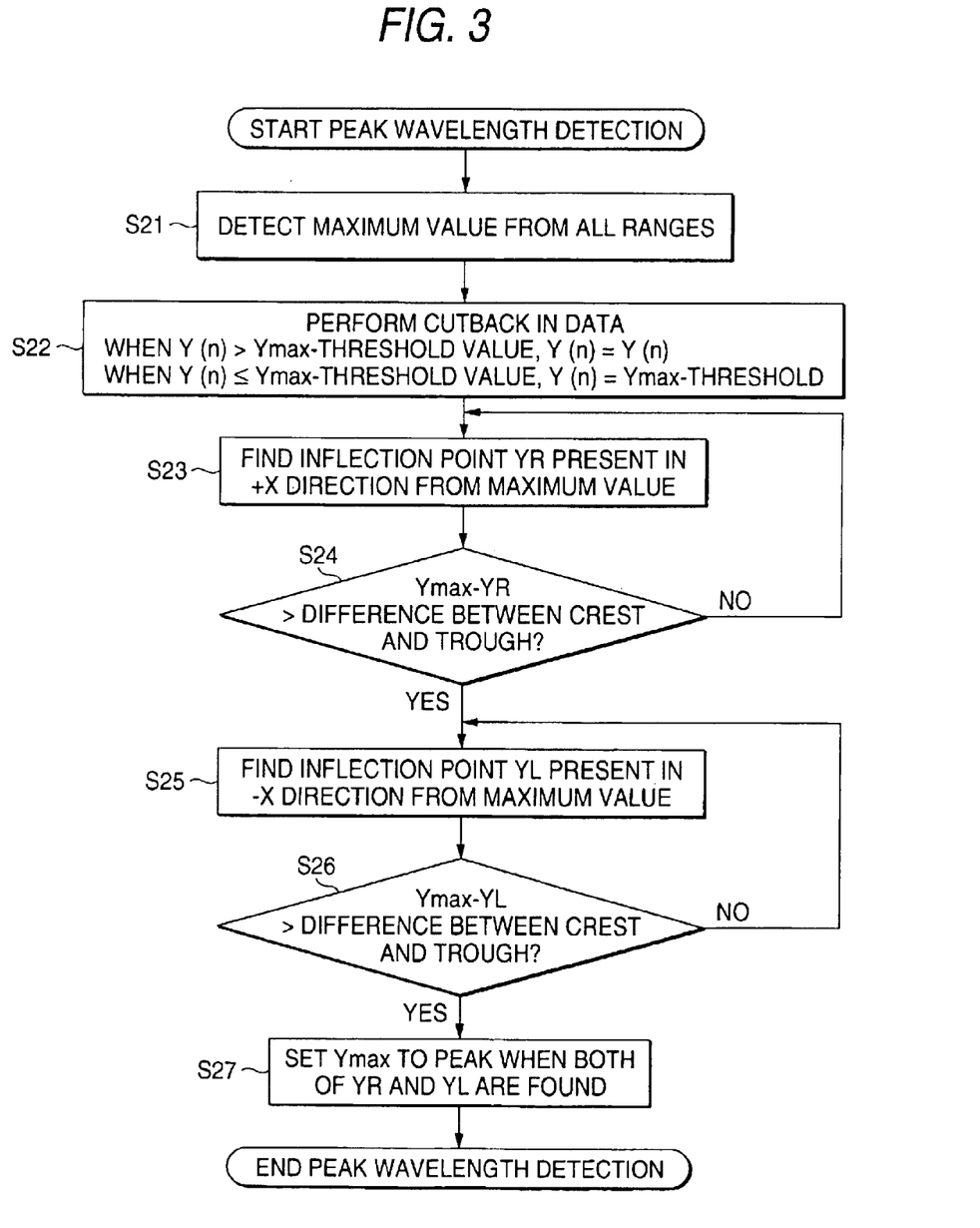
FIG. 3 is a diagram showing a flow of peak wavelength detection processing in FIG. 2.

FIG. 3 is a diagram showing a flow of the peak wavelength detection processing.

In the peak wavelength detection processing, first, the maximum value Ymax of a level is detected from all the wavelength ranges of measurement data (FIG. 4) showing a relation between a wavelength and a level value (S21).

Next, a cutback in data is performed using the maximum value Ymax and a preset threshold value Yth (S22). That is, when a relation to a measured value Y (n) other than the maximum value Ymax is Y(n)>(Ymax−Yth), Y(n)=Y(n), namely the value of Y(n) is used as it is, and when the relation is Y(n)=<(Ymax−Yth), Y(n)=Ymax−Yth, namely the value of Y(n) is replaced with (Ymax−Yth).

Then, an inflection point YR present in the long wavelength side (plus direction of the X axis) from the maximum value Ymax is detected (S23). The inflection point YR means a point at which polarity of a difference between data adjacent back and forth changes from minus to plus. When the inflection point YR is not detected, the minimum value is set to YR.

Then, it is checked whether or not a difference between the maximum value Ymax and the inflection point YR, namely Ymax−YR is larger than a value of a difference between the crest and the trough preset (S24). As a result of that, when the difference is not larger (No in S24), the flow returns to S23. When the difference is larger (Yes in S24), it proceeds to the next step and in turn, an inflection point YL present in the short wavelength side (minus direction of the X axis) from the maximum value Ymax is detected (S25). The inflection point YL means a point at which polarity of a difference between data adjacent back and forth changes from minus to plus. When the inflection point YL is not detected, the minimum value is set to YL.

Then, it is checked whether or not a difference between the maximum value Ymax and the inflection point YL, namely Ymax−YL is larger than a value of a difference between the crest and the trough preset (S26). As a result of that, when the difference is not larger (No in S26), the flow returns to S25. When the difference is larger (Yes in S26), it proceeds to the final step.

In the final step, when both of the inflection point YR and the inflection point YL are found, a wavelength corresponding to the maximum value Ymax is set to a peak wavelength (measurement wavelength) and is passed to the polarization dependent loss measurement processing (S13) described above.

As described above, according to the polarization dependent loss measuring apparatus 1 of this embodiment, all the processing such as analysis of a wavelength dependent measurement result, detection of a wavelength at which PDL measurement is made, setting to a measuring device and association of a wavelength dependent analysis result with a PDL measurement result conventionally performed by an operator can be performed automatically, so that the PDL can be made easily in a short time.

Further, processing for associating the wavelength dependent analysis result with the PDL measurement result can also be performed automatically, so that the PDL measurement result can be grasped easily as a measurement result every each the measurement wavelength.

Incidentally, in the embodiment described above, it is constructed so that a result in which the wavelength dependent analysis result is associated with the PDL measurement result is displayed on the display part 2, but it may be constructed so that a printer is provided and printing is outputted.

Also, in the example described above, the configuration example in which the polarization dependent loss measuring apparatus 1 integrally provides the polarization controller part 5 is shown, but the polarization controller part 5 may be configured separately from the polarization dependent loss measuring apparatus body.

Further, in the embodiment described above, a notch wavelength (wavelength with inverse shape of the peak) which is a wavelength (measurement wavelength) at the time when loss or gain of the transmitted light from the measured object 8 becomes minimum based on a wavelength dependent measurement result may be detected to make polarization dependent loss measurement.

Figure 8:
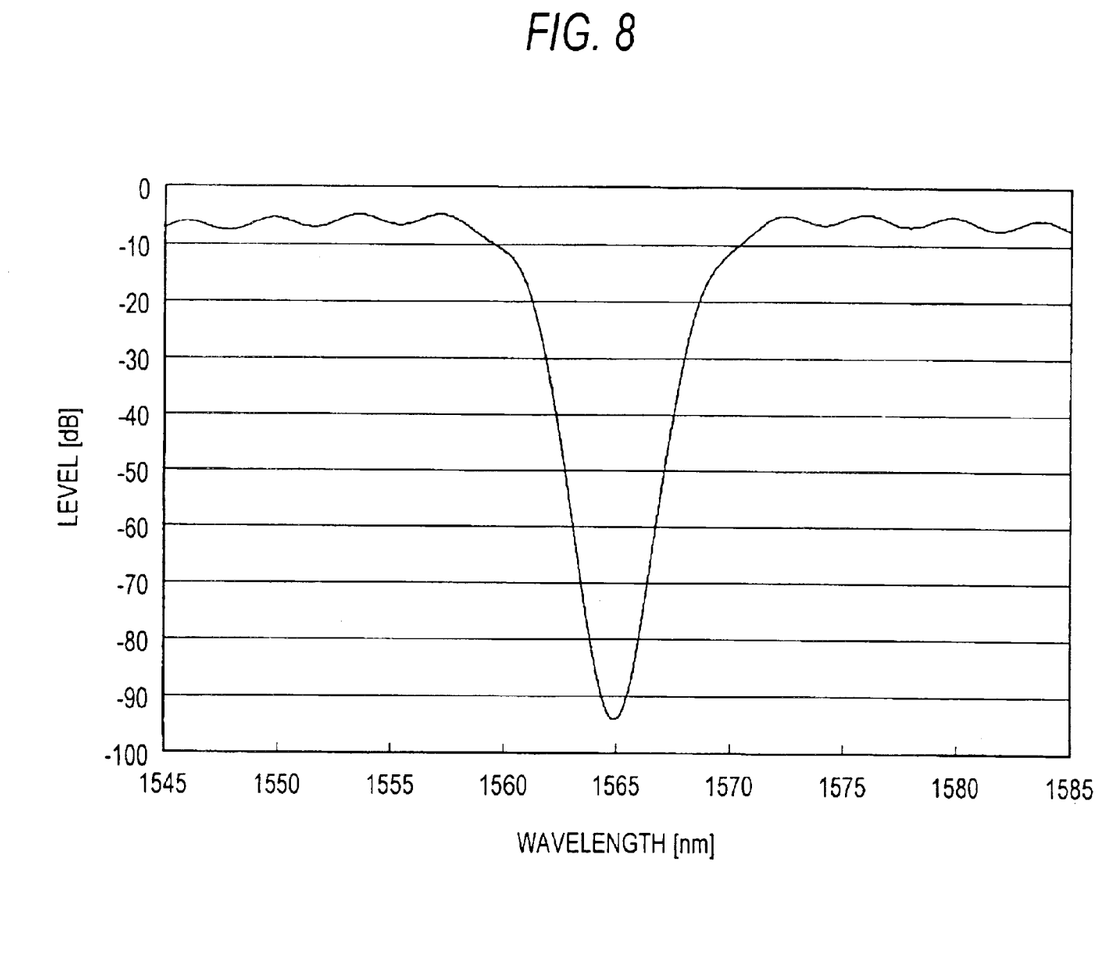
FIG. 8 is a diagram showing one example (example of a notch wavelength) of a wavelength dependent measurement result.

In this case, by inverting "maximum" and "minimum" in the peak wavelength detection processing (S12) described above, notch wavelength detection processing can be performed in a similar flow and a wavelength dependent measurement result of a notch wavelength is shown In FIG. 8.

As described above, according to the invention, PDL measurement and association of a PDL measurement result with a wavelength dependent measurement result can be made automatically, so that a polarization dependent loss measuring apparatus capable of easily making the PDL measurement in a short time and easily grasping the PDL measurement result as a measurement result every each the measurement wavelength can be provided.

What is claimed is:

1. A polarization dependent loss measuring apparatus comprising:

wavelength dependent measurement member for measuring transmitted light from a measured object while changing a wavelength of light incident on the measured object, peak wavelength detection member for detecting a wavelength at the time when a level of loss or gain of the transmitted light becomes maximum based on a measurement result by said wavelength dependent measurement member, polarization dependent loss measurement member for measuring polarization dependent loss of the measured object by measuring the transmitted light from the measured object while launching light of a wavelength detected by said peak wavelength detection member into the measured object and also randomly changing a polarization state of the light, measurement result processing member for performing association processing of a measurement result by said polarization dependent loss measurement member with a detection result by said peak wavelength detection member, and output member for outputting a processing result by said measurement result processing member.

2. The polarization dependent loss measuring apparatus as defined in claim 1, wherein said peak wavelength detection member executes:

a step of detecting the maximum value of the level from all the wavelength ranges based on the measurement result by said wavelength dependent measurement member, a step of performing a cutback in a measurement level value using the maximum value and a preset threshold value, a step of detecting inflection points of the level in the longer wavelength side and the shorter wavelength side than a wavelength showing the maximum value, and a step of detecting a wavelength corresponding to the maximum value as a wavelength at the time when the level becomes maximum when the inflection points of the level are present in both of the longer wavelength side and the shorter wavelength side than the wavelength showing the maximum value.

3. A polarization dependent loss measuring apparatus comprising:

wavelength dependent measurement member for measuring transmitted light from a measured object while changing a wavelength of light incident on the measured object, notch wavelength detection member for detecting a wavelength at the time when a level of loss or gain of the transmitted light becomes minimum based on a measurement result by said wavelength dependent measurement member, polarization dependent loss measurement member for measuring polarization dependent loss of the measured object by measuring the transmitted light from the measured object while launching light of a wavelength detected by said notch wavelength detection member into the measured object and also randomly changing a polarization state of the light, measurement result processing member for performing association processing of a measurement result by said polarization dependent loss measurement member with a detection result by the notch wavelength detection member, and output member for outputting a processing result by said measurement result processing member.

4. The polarization dependent loss measuring apparatus as defined in claim 3, wherein said notch wavelength detection member executes:

a step of detecting the minimum value of the level from all the wavelength ranges based on the measurement result by said wavelength dependent measurement member, a step of performing a cutback in a measurement level value using the minimum value and a preset threshold value, a step of detecting inflection points of the level in the longer wavelength side and the shorter wavelength side than a wavelength showing the minimum value, and a step of detecting a wavelength corresponding to the minimum value as a wavelength at the time when the level becomes minimum when the inflection points of the level are present in both of the longer wavelength side and the shorter wavelength side than the wavelength showing the minimum value.

5. The polarization dependent loss measuring apparatus as in claim 1, wherein said output member produces an output by displaying or printing a processing result by said measurement result processing member.

6. The polarization dependent loss measuring apparatus as in claim 3, wherein said output member produces an output by displaying or printing a processing result by said measurement result processing member.

* * * * *